(12) United States Patent
Somashekar et al.

(10) Patent No.: US 9,037,101 B1
(45) Date of Patent: May 19, 2015

(54) SWITCHING POWER BETWEEN POWER AMPLIFIER SYSTEMS IN A REMOTE RADIO HEAD SYSTEM

(71) Applicant: Sprint Communications Company L.P., Overland Park, KS (US)

(72) Inventors: Sharath Somashekar, Overland Park, KS (US); Cody Carl Heinrich, Gardner, KS (US); Mark Alan Wade, Trimble, MO (US); Xianghong Zeng, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/142,056

(22) Filed: Dec. 27, 2013

(51) Int. Cl.
*H04B 1/04* (2006.01)
*H04W 72/04* (2009.01)
*H04W 4/22* (2009.01)

(52) U.S. Cl.
CPC ............ *H04W 72/0406* (2013.01); *H04W 4/22* (2013.01)

(58) Field of Classification Search
USPC ................................... 455/114.2, 404.1, 453
See application file for complete search history.

(56) References Cited

U.S. PATENT DOCUMENTS

| 6,047,175 A | 4/2000 | Trompower |
| 2011/0075754 A1 | 3/2011 | Smith |
| 2011/0158081 A1 | 6/2011 | Wang et al. |

FOREIGN PATENT DOCUMENTS

WO   2009082084   7/2009

*Primary Examiner* — Joel Ajayi

(57) ABSTRACT

A remote radio head system (RRH) transmits first Radio-Frequency-signals (signals) at a first frequency-band (band) and second signals at a second band. The RRH receives and processes first control-data (data) to determine a first duty-cycle (cycle). In response to the first data and based on the first cycle, the RRH switches power between a first power amplifier system (PA) and a second PA and transmits the first signals at the first band through the first PA and transmits the second signals at the second band through the second PA. The RRH receives and processes second data to determine a second cycle. Responding to the second data and based on the second cycle, the RRH switches power between the first PA and the second PA and transmits the first signals at the first band through the first PA and transmits the second signals at the second band through the second PA.

20 Claims, 5 Drawing Sheets

SWITCHING POWER BETWEEN POWER AMPLIFIER SYSTEMS IN A REMOTE RADIO HEAD SYSTEM

TECHNICAL BACKGROUND

Product evolution has resulted in a physical division of a cellular base station into two spatially separated primary components, a remote radio head and a baseband unit. The remote radio head implements the air interface and is relieved of backhaul responsibilities by the baseband unit. The remote radio head is located according to radio coverage concerns, whereas the baseband unit may be located elsewhere because it is fragile or for easy maintenance.

A baseband unit may serve multiple collocated remote radio heads, thereby reducing rollout costs and power consumption. If the baseband unit is multi-mode or multi-band, it may serve multiple cellular networks that cover the same vicinity by serving a different remote radio head for each cellular network. Collocation of radio transmitters of different cellular networks may cause inter-band interference, especially if the radio bands of the two cellular networks are nearly spectrally adjacent. For example a commercial cellular network and an emergency response cellular network may have collocated transmitters with adjacent bands that cause passive intermodulation interference.

Saving cost by accommodating multiple bands with the same equipment also applies to the design of a remote radio head. A multi-band remote radio head transmits for multiple cellular networks if fed either by a single multi-band baseband unit for all of the cellular networks or by multiple single-band baseband units with each unit serving a separate cellular network. Despite the cost savings, a multi-band remote radio head does not alleviate inter-band interference of collocated transmitters.

Inter-band interference by two collocated transmitters occurs when both transmitters transmit simultaneously. Hence coordination between collocated transmitters can avoid inter-band interference by scheduling alternating transmission periods such that the transmitters take turns transmitting. Due to its centralized control of its antennas, a multi-band remote radio head is well suited to achieve alternating transmission periods.

TECHNICAL OVERVIEW

A remote radio head system transmits first Radio Frequency (RF) signals at a first frequency band and second RF signals at a second frequency band. The remote radio head system receives and processes first control data to determine a first duty cycle. In response to the first control data, the remote radio head system switches power between a first power amplifier system and a second power amplifier system based on the first duty cycle. Also based on the first duty cycle, the remote radio head system transmits the first RF signals at the first frequency band through the first power amplifier system and transmits the second RF signals at the second frequency band through the second power amplifier system. The remote radio head system also receives and processes second control data to determine a second duty cycle. In response to the second control data, the remote radio head system switches power between the first power amplifier system and the second power amplifier system based on the second duty cycle. Also based on the second duty cycle, the remote radio head system transmits the first RF signals at the first frequency band through the first power amplifier system and transmits the second RF signals at the second frequency band through the second power amplifier system.

DETAILED DESCRIPTION

Figure 1:
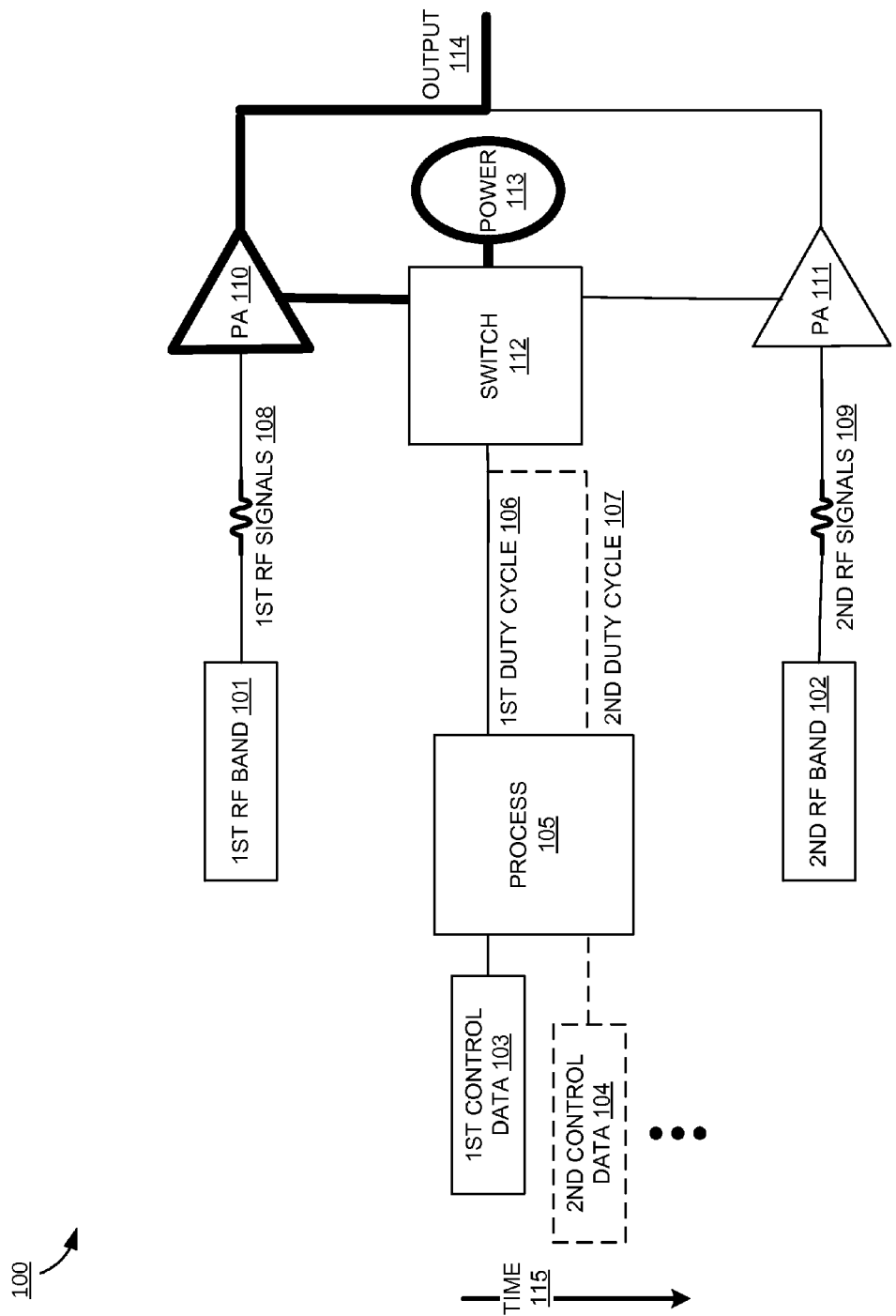
FIG. 1 illustrates a remote radio head system that switches power between amplifier systems.

FIG. 1 illustrates remote radio head system 100 that switches power between amplifier systems. Remote radio system 100 includes process 105, switch 112, and power amplifier systems 110-111. By switching power between power amplifier systems 110-111, remote radio head system 100 alternates between transmitting first RF band 101 and transmitting second RF band 102. Remote radio head system 100 does not simultaneously transmit all frequencies of both RF bands. Although no RF receiver is shown and depending on the implementation, remote radio system 100 may simultaneously receive some or all frequencies of both RF bands.

Remote radio head system 100 is configured with internal paths for control, RF signals, and power. Switching between power amplifier systems 110-111 is controlled by the series of first control data 103, process 105, first duty cycle 106, and switch 112. Depending on the implementation, process 105 may involve a voltage controlled oscillator, control logic, or other circuitry that generates a duty cycle according to control data.

Remote radio head system 100 receives first control data 103 and determines first duty cycle 106 per process 105. First control data 103 may come from a baseband unit, a base station, or other baseband processor. The dimensions of first control data 103 depend on the application. First control data 103 may specify the timing of duty cycle 106. Alternatively first control data 103 may burden process 105 with calculating timing. For example first control data 103 may instead specify a ratio, a minimum, or complicated information from which timing may be derived.

First duty cycle 106 drives switch 112 to send power 113 to one of power amplifier systems 110-111. Switch 112 is a logical component that may involve any logic circuitry capable of variable alternation of connectivity between power 113 and power amplifier systems 110-111.

During some phase of first duty cycle 106, as shown, switch 112 supplies power to power amplifier system 110 instead of to power amplifier system 111. During another phase not shown, switch 112 reroutes the delivery of power 113 to avoid power amplifier system 110 and instead to power amplifier system 111. The repeated changes according to first duty cycle 106 achieve alternation back and forth as to which of power amplifier systems 110-111 has power. As such power amplifier systems 110-111 take turns with power 113.

The bold wires show that power 113 energizes a portion of remote radio head 100 that includes power amplifier system 110 and output 114. Although not show, output 114 may lead to a transmitter antenna or other component. Output 114 transmits amplified RF signals more or less continuously. However what output 114 transmits is a time multiplexing of RF signals 108-109.

Remote radio head system 100 is multi-band or multi-mode and shown for example as dual mode, using RF bands 101-102. The air protocols of RF bands 101-102 may be distinct or identical. Because this example is dual mode, two RF signal paths are shown. Both RF signal paths flow to output 114 from either of RF bands 101-102. Due to switch 112, only one of the two RF signal paths has power 113. Because power amplifier system 110 has power as shown, first RF signals 108 are amplified and sent to output 114.

Eventually and according to the progression of time 115, second control data 104 is received by remote radio head system 100. Time 115 continues to progress and still more control data may be received, as indicated by the vertical ellipsis. Whenever a control data is received, a new duty cycle is generated and the previous duty cycle ceases. As such when second control data 104 is received, process 105 ceases maintaining first duty cycle 106 and begins to generate second duty cycle 107.

At times the dynamic demand for throughput of RF bands 101-102 may be unequal. The duty cycle fed to switch 112 might not match the relative loads of RF bands 101-102. Remote radio head system 100 may be dynamically tuned to adjust to a shifting load balance. Dynamic tuning may be achieved with a time series of changing control data.

Figure 2:
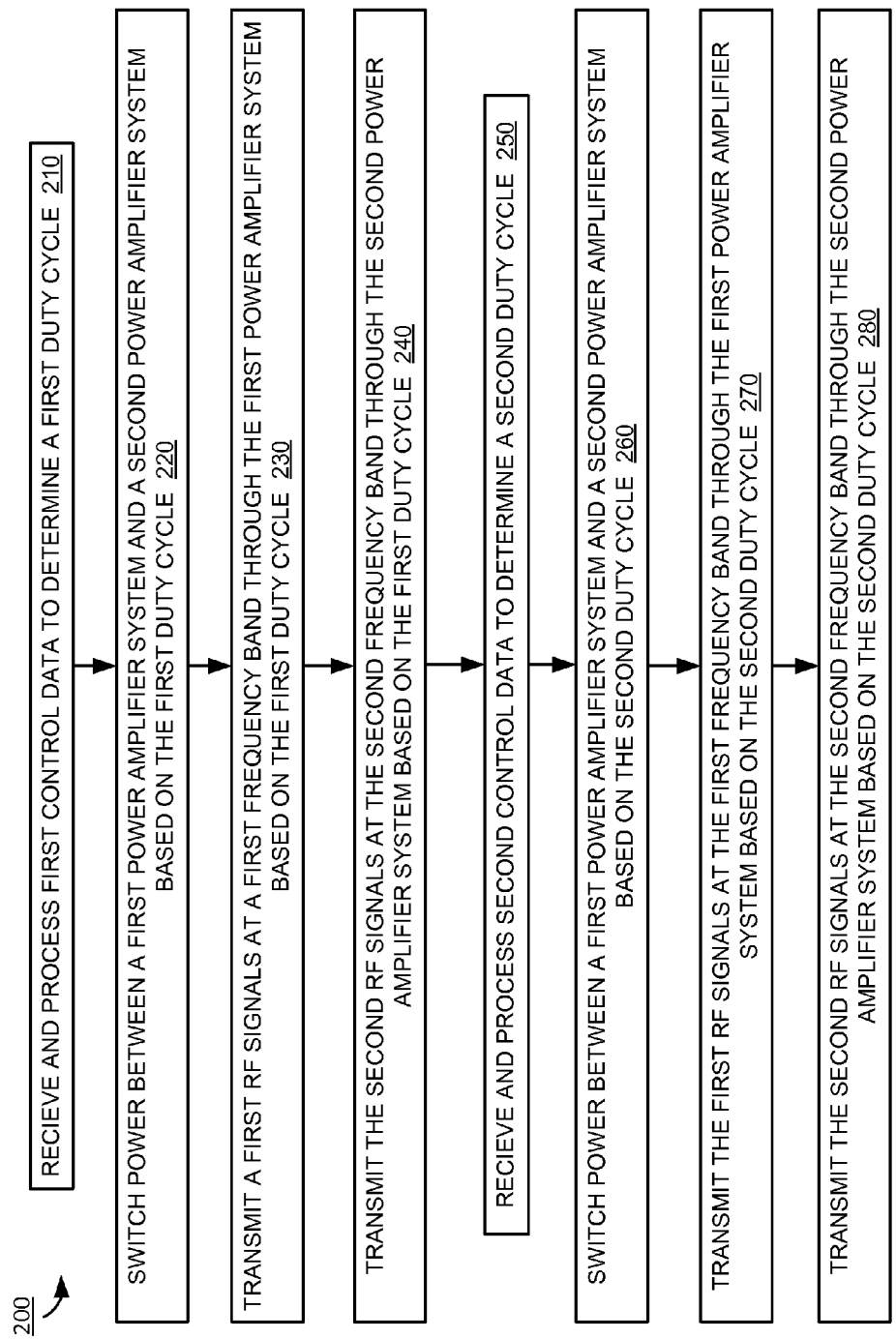
FIG. 2 illustrates the behavior of a remote radio head system that switches power between amplifier systems.

The states and operations involved with switching power according to control data received by remote radio head system 100 are illustrated as behaviors 200 in FIG. 2. Remote radio head system 100 receives (210) and processes a first control data to determine a first duty cycle. Remote radio head system 100 switches (220) power between a first power amplifier system and a second power amplifier system based on the first duty cycle. Remote radio head system 100 transmits (230) a first RF signals at a first frequency band through the first power amplifier system based on the first duty cycle. Remote radio head system 100 transmits (240) a second RF signals at a second frequency band through the second power amplifier system based on the first duty cycle. After those behaviors occur, eventually the first control data is replaced by a second control data. Remote radio head system 100 receives (250) and processes a second control data to determine a second duty cycle. Remote radio head system 100 switches (260) power between a first power amplifier system and a second power amplifier system based on the second duty cycle. Remote radio head system 100 transmits (270) a first RF signals at a first frequency band through the first power amplifier system based on the second duty cycle. Remote radio head system 100 transmits (280) a second RF signals at a second frequency band through the second power amplifier system based on the second duty cycle.

Figure 3:
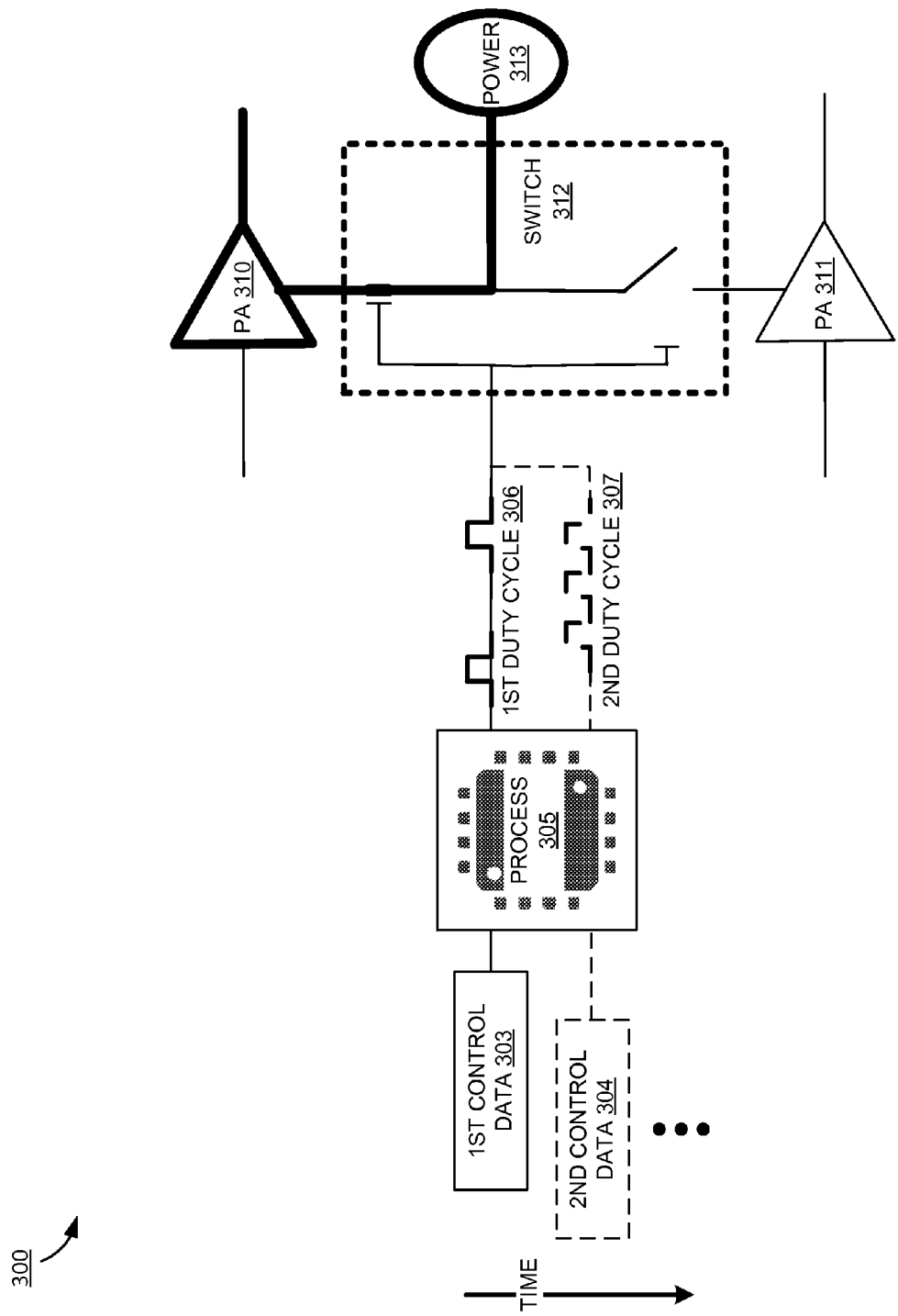
FIG. 3 illustrates a remote radio head system that switches power between amplifier systems.

FIG. 3 illustrates the control path of remote radio head system 300 that uses pulse modulation to switch power. Remote radio system 300 includes process 305, switch 312, and power amplifiers 310-311. Process 305 may be implemented on a computer or other control circuitry. First duty cycle 306 is generated from first control data 303 according to process 305. First duty cycle 306 is pulse modulated, with pulses causing switch 312 to give power 313 to power amplifier system 310, as shown with bold wires. First duty cycle 306 also has spaces between the pulses. Although not shown, these spaces cause switch 312 to cease power to power amplifier system 310 and instead give power 313 to power amplifier system 311.

The duration of a pulse may vary, as may the delay between two pulses. As shown second duty cycle 307 has more pulses than does first duty cycle 307. As such second duty cycle 307 provides more throughput to the signal traffic that passes through power amplifier system 311 than is provided by first duty cycle 307. Hence load balance between the two signal traffics can be tuned by adjusting the frequency of pulses. Adjusting pulse width is another pulse modulation tactic to achieve load balance tuning.

Emergency communications is an application that may benefit from alternating RF bands and tunable load balancing. For example LTE cellular access may be segregated into nearly adjacent RF bands, with band 12 for the general public and band 14 for emergency responders only. Depending on the assignment of bands to frequencies, bands 12 and 14 might be nearly adjacent and suffer some cross band interference. The problem of cross band interference is acute when bands 12 and 14 share a remote radio head system that simultaneously transmits the LTE downlink of both bands.

Figure 4:
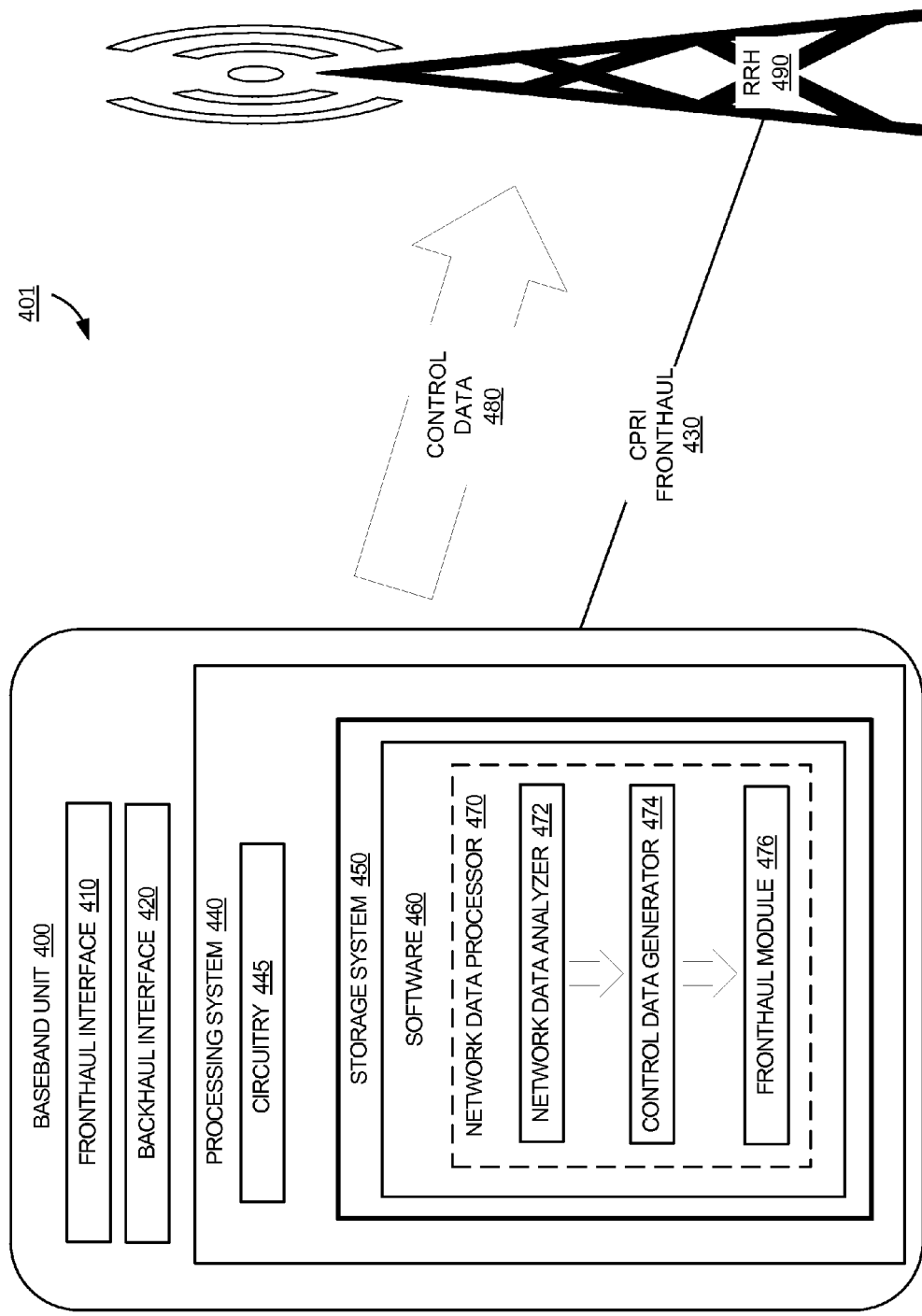
FIG. 4 illustrates communication system that switches power between amplifier systems based on network data.

FIG. 4 illustrates dual band LTE communication system 401 including remote radio head system 490 and baseband unit 400 connected by CPRI fronthaul 430. Instead of CPRI, fronthaul 430 may run another protocol appropriate for digital radio, baseband, or fronthaul. Remote radio head system 490 switches power between public band transmission and emergency band transmission according to a duty cycle that it receives in control data 480 from baseband unit 400. During an emergency demand for the emergency band rises and threatens to exceed the throughput provided by the present duty cycle. Baseband unit 400 detects that conditions have changed and reacts by adjusting the duty cycle. The result of the adjustment is a new duty cycle.

Baseband unit 400 generates new control data that indicates the new duty cycle. The new control data is transferred to remote radio head 410, which executes the new duty cycle. The new duty cycle reassigns some transmission time away from the public band and over to the emergency band. By reassigning some transmission time, remote radio head system 490 accommodates the increased demand for the emergency band. After the emergency passes, some transmission time can be shifted back to the public band. As such remote radio head system 490 load balances between public and emergency bands.

A base station knows which wireless devices are connected to it, perhaps according to the radio resource control layer of an eNodeB. Dual band baseband unit 400 may count how many users are on one band and then select a duty cycle that fits that count. For example a doubling of emergency users matches a duty cycle with twice as much emergency band transmission time. Baseband unit 400 may fit the duty cycle to a count of either public users, emergency users, or both. If baseband unit 400 counts users on each band and the emergency occurs during rush hour when the public band is heavily used, then there may be a doubling of public users in addition to the doubling of emergency users. As such the ratio of public users to emergency users would be unchanged and baseband unit 400 may maintain the present duty cycle.

A base station knows how much data it transmits on its downlink, perhaps according to an LTE scheduler. Dual band baseband unit 400 may count how much wireless data is consumed by all users on one band and then select a duty cycle that fits that count. For example a doubling of wireless data transmitted on the downlink matches a duty cycle with twice as much emergency band transmission time. Baseband unit 400 may fit the duty cycle to a count of either data consumed by public users, emergency users, or both. If baseband unit 400 counts data consumption on each band and the emergency occurs during rush hour when the public band is heavily used, then there may be a doubling of public user data consumption in addition to the doubling of emergency user data consumption. As such the ratio of public user data consumption to emergency user data consumption would be unchanged and baseband unit 400 may maintain the present duty cycle.

LTE isolates a control plane from a user plane. Each plane has its own channels, either logical or physical. Increasing load on a control channel may indicate increased demand for transmission time. Dual band baseband unit 400 may measure how loaded are the control channels of one band and then select a duty cycle that fits that measurement. For example a doubling of control channel load on the emergency band matches a duty cycle with twice as much emergency band transmission time. Baseband unit 400 may fit the duty cycle to a load measurement of either public users, emergency users, or both. If baseband unit 400 measures the control channels load on each band and the emergency occurs during rush hour when the public band is heavily used, then there may be a doubling of load on control channels on the public band in addition to the doubling of load on control channels on the emergency band. As such the ratio of load on control channels on the public band to load on control channels on the emergency band would be unchanged and baseband unit 400 may maintain the present duty cycle.

Baseband unit 400 is shown with an example internal configuration, although alternative configurations are possible. Baseband unit 400 comprises fronthaul interface 410, backhaul interface 420, and processing system 440. Processing system 440 is linked to fronthaul interface 410 and backhaul interface 420. Processing system 440 includes processing circuitry 445 which is connected to storage system 450 that stores operating software 460. Baseband unit 400 may include other well-known components such as a power supply and enclosure that are not shown for clarity.

Backhaul interface 420 connects to wireless service provider infrastructure via a network link which may by wireless or cabled. Baseband unit 400 communicates over the backhaul link through backhaul interface 420. Network interfaces 410 and 420 have communication circuitry such as an amplifier, filter, signal modulator, and signal processing circuitry that is appropriate to the transmission medium that carries the network link.

Processing circuitry 445 comprises microprocessor and other circuitry that retrieves and executes operating software 460 from storage system 450. Storage system 450 comprises a non-transitory storage medium, such as a disk drive, flash drive, data storage circuitry, or some other memory apparatus. Processing circuitry 445 is typically mounted on a circuit board that may also hold storage system 450 and portions of network interfaces 410 and 420. Operating software 460 comprises computer programs, firmware, or some other form of machine-readable processing instructions. Operating software 460 includes eNodeB system logic and network data processor 470, which is an implementation of the behaviors of baseband unit 400 for gathering network data and emitting control data as discussed above. Operating software 460 may also include an operating system, utilities, drivers, network interfaces, applications, or some other type of software. When executed by processing circuitry 445, operating software 460 directs processing system 440 to operate baseband unit 400 as described above.

The implementation of network data processor 470 may be an aggregation of internal modules such as those shown. Network data analyzer 472 obtains LTE-related operational data which it digests and delivers to control data generator 474. Control data generator 474 processes the network data to create control data needed for load balancing. Finally the control data is sent by fronthaul module 476 through fronthaul interface 410 and out to remote radio head system 490. Implementations of network data processor 470 have flexibility as to how many logic modules are present and how responsibilities are distributed amongst the modules.

Figure 5:
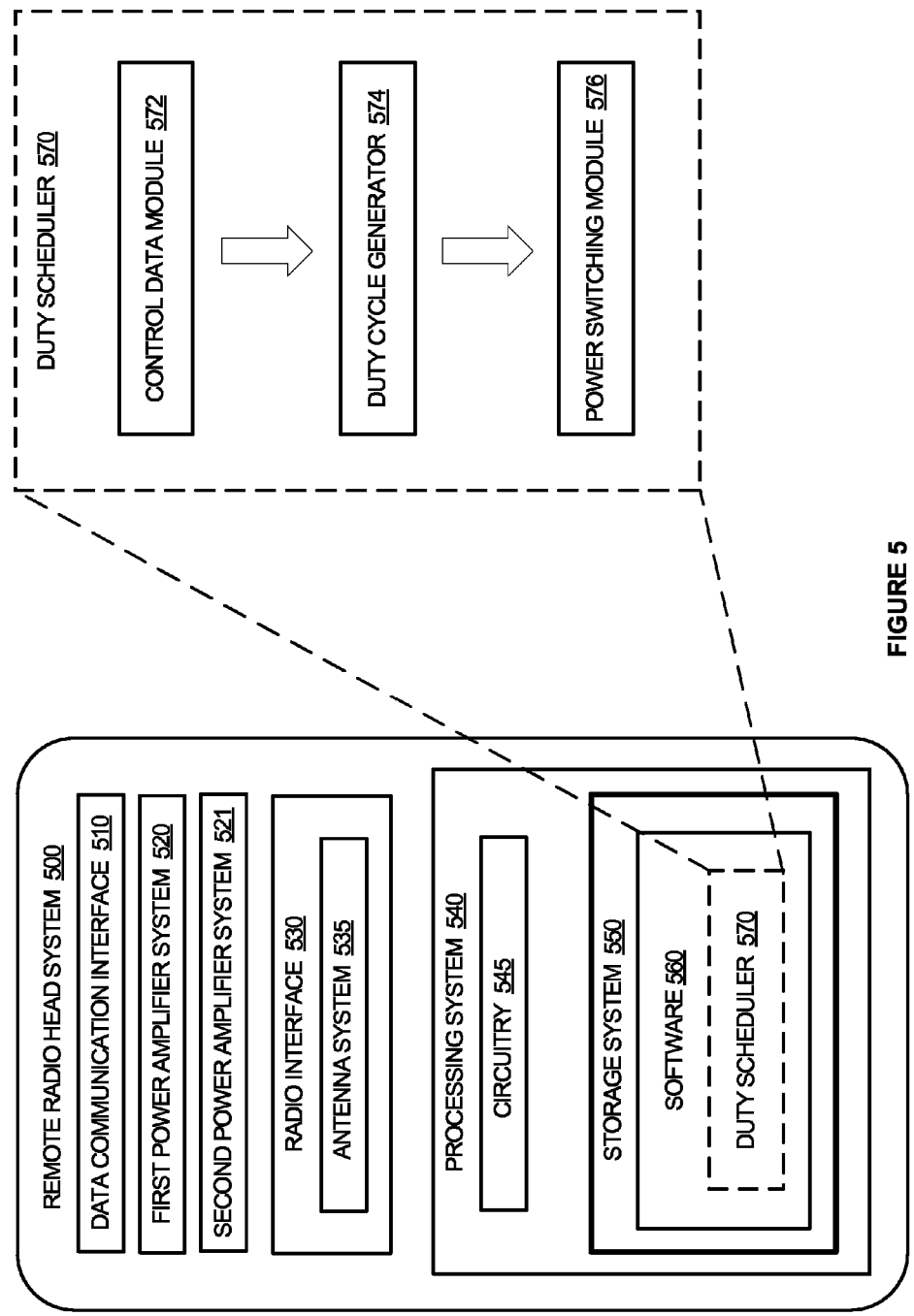
FIG. 5 illustrates an internal configuration of a remote radio head system that switches power between amplifier systems.

FIG. 5 illustrates remote radio head system 500, which is an example internal configuration of remote radio head system 100, 300, and 490, although those remote radio head systems could use alternative configurations. Remote radio head system 500 comprises data communication interface 510, power amplifier systems 520-521, radio interface 530, and processing system 540. Processing system 540 is linked to communication interface 510 and radio interface 530. Processing system 540 includes processing circuitry 545 which is connected to storage system 550 that stores operating software 560. Remote radio head system 500 may include other well-known components such as a power supply and enclosure that are not shown for clarity. Remote radio head system 500 may be part of an LTE eNodeB or another base station with an air interface such as WiMax, GSM, or CDMA.

Radio interface 530 comprises RF communication circuitry and antenna system 535. The RF communication circuitry typically includes an amplifier, filter, RF modulator, and signal processing circuitry. Radio interface 530 may also include a memory device, software, processing circuitry, or some other communication device. Remote radio head system 500 connects to a baseband unit via a fronthaul cable or baseband cable which may be copper or fiber. Remote radio head system 500 communicates over the cable through data communication interface 510. Data communication interface 510 has communication circuitry such as an amplifier, filter, signal modulator, and signal processing circuitry that is appropriate to the cable transmission medium.

Remote radio head system 500 receives control traffic and bearer traffic through data communication interface 510. The bearer traffic and other traffic destined for aerial transmission is amplified, filtered, and otherwise conditioned by power amplifier systems 520-521. Power amplifier systems 520-521 individually receive power according to a duty cycle determined by remote radio head system 500.

Processing circuitry 545 comprises microprocessor and other circuitry that retrieves and executes operating software 560 from storage system 550. Storage system 550 comprises a non-transitory storage medium, such as a disk drive, flash drive, data storage circuitry, or some other memory apparatus. Processing circuitry 545 is typically mounted on a circuit board that may also hold storage system 550 and portions of communication interface 510 and radio interface 530. Operating software 560 comprises computer programs, firmware, or some other form of machine-readable processing instructions. Operating software 560 includes duty scheduler 570, which is an implementation of the states and operations illustrated in FIG. 2 tailored according to desired features. Operating software 560 may also include an operating system, utilities, drivers, network interfaces, applications, or some other type of software. When executed by processing circuitry 545, operating software 560 directs processing system 540 to operate remote radio head system 500 as described herein and in accordance with duty scheduler 570.

The implementation of target selection logic 570 may be an aggregation of modules such as those shown in FIG. 5. Control data module 572 receives control data from data communication interface 510 and delivers the control data in a format usable by duty cycle generator 574. Duty cycle generator 574 selects a duty cycle that best fits the operating conditions described in the control data. The duty cycle is delivered to power switching module 576 which uses the duty cycle to control when power is supplied to which power amplifier system. Implementations of duty scheduler 570 have flexibility as to how many logic modules are present and how responsibilities are distributed amongst the modules.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a remote radio head system to transmit first Radio Frequency (RF) signals at a first frequency band and to transmit second RF signals at a second frequency band, the method comprising:
   receiving and processing first control data to determine a first duty cycle;
   in response to the first control data, switching power between a first power amplifier system and a second power amplifier system based on the first duty cycle, transmitting the first RF signals at the first frequency band through the first power amplifier system based on the first duty cycle, and transmitting the second RF signals at the second frequency band through the second power amplifier system based on the first duty cycle;
   receiving and processing second control data to determine a second duty cycle;
   in response to the second control data, switching the power between the first power amplifier system and the second power amplifier system based on the second duty cycle, transmitting the first RF signals at the first frequency band through the first power amplifier system based on the second duty cycle, and transmitting the second RF signals at the second frequency band through the second power amplifier system based on the second duty cycle.

2. The method of claim 1 further comprising:
   processing network data to determine a first number of users on the first frequency band and a second number of users on the second frequency band;
   processing the first number of users and the second number of users to determine the second duty cycle; and
   generating and transferring the second control data indicating the second duty cycle.

3. The method of claim 1 further comprising:
   processing network data to determine a number of users on the first frequency band;
   processing the number of users to determine the second duty cycle; and
   generating and transferring the second control data indicating the second duty cycle.

4. The method of claim 1 further comprising:
   processing network data to determine a number of emergency-response users on the first frequency band;
   processing the number of emergency-response users to determine the second duty cycle; and
   generating and transferring the second control data indicating the second duty cycle.

5. The method of claim 1 further comprising:
   processing network data to determine a first amount of data consumption on the first frequency band and a second amount of data consumption on the second frequency band;
   processing the first amount of data consumption and the second amount of data consumption to determine the second duty cycle; and
   generating and transferring the second control data indicating the second duty cycle.

6. The method of claim 1 further comprising:
   processing network data to determine an amount of data consumption on the first frequency band;
   processing the amount of data consumption to determine the second duty cycle; and
   generating and transferring the second control data indicating the second duty cycle.

7. The method of claim 1 further comprising:
   processing network data to determine an amount of emergency-response data consumption on the first frequency band;
   processing the amount of emergency-response data consumption to determine the second duty cycle; and
   generating and transferring the second control data indicating the second duty cycle.

8. The method of claim 1 further comprising:
   processing network data to determine a first control channel load on the first frequency band and a second control channel load on the second frequency band;
   processing the first control channel load and the second control channel load to determine the second duty cycle; and
   generating and transferring the second control data indicating the second duty cycle.

9. The method of claim 1 further comprising:
   processing network data to determine a control channel load on the first frequency band;
   processing the control channel load to determine the second duty cycle; and
   generating and transferring the second control data indicating the second duty cycle.

10. The method of claim 1 further comprising:
    processing network data to determine an emergency-response control channel load on the first frequency band;
    processing the emergency-response control channel load to determine the second duty cycle; and
    generating and transferring the second control data indicating the second duty cycle.

11. A remote radio head system to transmit first Radio Frequency (RF) signals at a first frequency band and to transmit second RF signals at a second frequency band, the remote radio head system comprising:
    a data communication interface configured to receive first control data;
    a processing system configured to process the first control data to determine a first duty cycle, and in response, to switch power between a first power amplifier system and a second power amplifier system based on the first duty cycle, drive transmission of the first RF signals at the first frequency band through the first power amplifier system based on the first duty cycle, and drive transmission of the second RF signals at the second frequency band through the second power amplifier system based on the first duty cycle;
    the data communication interface configured to receive second control data;
    the processing system configured to process the second control data to determine a second duty cycle, and in response, to switch the power between a first power amplifier system and a second power amplifier system based on the first duty cycle, drive transmission of the first RF signals at the first frequency band through the first power amplifier system based on the second duty cycle, and drive transmission of the second RF signals at the second frequency band through the second power amplifier system based on the second duty cycle.

12. The remote radio head system of claim 11 further comprising a radio control system configured to process network data to determine a first number of users on the first frequency band and a second number of users on the second frequency band, process the first number of users and the second number of users to determine the second duty cycle, and generate and transfer the second control data indicating the second duty cycle.

13. The remote radio head system of claim 11 further comprising a radio control system configured to process network data to determine a number of users on the first frequency band, process the number of users to determine the second duty cycle, and generate and transfer the second control data indicating the second duty cycle.

14. The remote radio head system of claim 11 further comprising a radio control system configured to process network data to determine a number of emergency-response users on the first frequency band, process the number of emergency-response users to determine the second duty cycle, and generate and transfer the second control data indicating the second duty cycle.

15. The remote radio head system of claim 11 further comprising a radio control system configured to process network data to determine a first amount of data consumption on the first frequency band and a second amount of data consumption on the second frequency band, process the first amount of data consumption and the second amount of data consumption to determine the second duty cycle, and generate and transfer the second control data indicating the second duty cycle.

16. The remote radio head system of claim 11 further comprising a radio control system configured to process network data to determine an amount of data consumption on the first frequency band, process the amount of data consumption to determine the second duty cycle, and generate and transfer the second control data indicating the second duty cycle.

17. The remote radio head system of claim 11 further comprising a radio control system configured to process network data to determine an amount of emergency-response data consumption on the first frequency band, process the amount of emergency-response data consumption to determine the second duty cycle, and generate and transfer the second control data indicating the second duty cycle.

18. The remote radio head system of claim 11 further comprising a radio control system configured to process network data to determine a first control channel load on the first frequency band and a second control channel load on the second frequency band, process the first control channel load and the second control channel load to determine the second duty cycle, and generate and transfer the second control data indicating the second duty cycle.

19. The remote radio head system of claim 11 further comprising a radio control system configured to process network data to determine a control channel load on the first frequency band, process the control channel load to determine the second duty cycle, and generate and transferring the second control data indicating the second duty cycle.

20. The remote radio head system of claim 11 further comprising a radio control system configured to process network data to determine an emergency-response control channel load on the first frequency band, process the emergency-response control channel load to determine the second duty cycle, and generate and transfer the second control data indicating the second duty cycle.

\* \* \* \* \*